United States Patent
Hsu et al.

(10) Patent No.: US 9,216,788 B1
(45) Date of Patent: Dec. 22, 2015

(54) BICYCLE SADDLE

(71) Applicants: Chung-Ying Hsu, Taichung (TW);
Chien-Shun Lai, Changhua (TW);
Chia-Wen Lee, Changhua County (TW)

(72) Inventors: Chung-Ying Hsu, Taichung (TW);
Chien-Shun Lai, Changhua (TW);
Chia-Wen Lee, Changhua County (TW)

( * ) Notice: Subject to any disclaimer, the term of this patent is extended or adjusted under 35 U.S.C. 154(b) by 0 days.

(21) Appl. No.: 14/560,617

(22) Filed: Dec. 4, 2014

(51) Int. Cl.
*B62J 1/00* (2006.01)
*B62J 1/18* (2006.01)
*B62J 1/08* (2006.01)

(52) U.S. Cl.
CPC ..... *B62J 1/18* (2013.01); *B62J 1/08* (2013.01)

(58) Field of Classification Search
CPC ................ B62J 1/02; B62J 1/10; B62J 1/00; B62J 1/08; A47C 31/00
USPC ............... 297/195.1, 195.13, 195.12, 219.11, 297/412, 440.22, 215.15, 204–207, 215.16, 297/214
See application file for complete search history.

(56) References Cited

U.S. PATENT DOCUMENTS

| | | | | |
|---|---|---|---|---|
| 1,512,145 A * | 10/1924 | Starck | .......... | B62J 1/00 297/207 |
| 2,186,483 A * | 1/1940 | Guidetti | ........... | B62J 1/08 297/207 |
| 2,395,346 A * | 2/1946 | Schwinn | ........... | B62J 1/00 297/207 |
| 4,099,769 A * | 7/1978 | Jacobs | ........... | B62J 1/10 297/204 |
| 5,544,936 A * | 8/1996 | Bigolin | ........... | B62J 1/08 297/195.1 |
| 5,911,473 A * | 6/1999 | Hill | ........... | B62J 1/04 297/195.1 |
| 6,666,507 B1 * | 12/2003 | Ringgard | ........... | B62J 1/00 297/195.1 |
| 7,059,673 B1 * | 6/2006 | Lee | ........... | B62J 1/00 297/195.1 |
| 7,192,085 B2 * | 3/2007 | Lee | ........... | B62J 1/18 297/195.1 |
| 8,371,649 B2 * | 2/2013 | Segato | ........... | B62J 1/00 297/215.16 |
| 2004/0004375 A1 * | 1/2004 | Garland | ........... | B62J 1/00 297/204 |

FOREIGN PATENT DOCUMENTS

TW    M295609 U    8/2006
WO    WO 2012028901 A1 *    3/2012 ................ B62J 1/00

* cited by examiner

*Primary Examiner* — Beth Stephan
(74) *Attorney, Agent, or Firm* — Muncy, Geissler, Olds & Lowe, P.C.

(57) ABSTRACT

A bicycle saddle includes a leather cushion, a rail, and an adjusting assembly. The rail has a front end provided with an upward-extending portion, and has a rear end fixed to a rear end of the leather cushion. The adjusting assembly has a bolt holder, an adjusting bolt, and an adjusting seat. The bolt holder is fixed to a front end of the leather cushion and has a through hole. The adjusting bolt is rotatably received in the through hole of the bolt holder. The adjusting seat is fixed to the upward-extending portion of the rail and is screwed and engaged with the threaded trunk of the adjusting bolt. Thereby, the saddle is unlikely to sway and remains structurally stable during cycling, and noise can be effectively reduced.

10 Claims, 5 Drawing Sheets

BICYCLE SADDLE

BACKGROUND OF THE INVENTION

1. Technical Field

The present invention relates to bicycles, and more particularly to a bicycle saddle.

2. Description of Related Art

Generally, bicycle saddles are made of leather or plastic. Therein, leather saddles tend to lose tension or even sink over time due to cyclists' body weight and road vibration. Without proper correction, the loose saddles can have adverse effects on riding comfort.

For addressing this problem, Taiwan Patent No. M295609 uses the rotation of a fasten bolt to drive a guiding piece to move forward and backward, which in turn drives a bracket to adjust the surface tension of the cushion. However, in this patent, the bracket has a yoke retained in a receiving recess in the guiding piece by the fastening bolt, and such configuration tends to generate noise during cycling because the bracket rubs against the guiding piece. Also the retaining force applied to the bracket is limited, so the bracket can transversely move when receiving excess external force, and degrades the stability of the overall structure.

BRIEF SUMMARY OF THE INVENTION

The primary objective of the present invention is to provide a bicycle saddle that is more structurally stable and has less noise as compared to the prior art.

For achieving the foregoing objective, in a first embodiment of the present invention, the saddle comprises a leather cushion, a rail, and an adjusting assembly. The rail supports the leather cushion from below. The rail has its front end provided with an upward-extending portion and a retaining bay defined by the upward-extending portion. The rail has its rear end fixed to the rear end of the leather cushion. The adjusting assembly is affixed to the bottom surface of the leather cushion and has a bolt holder, an adjusting bolt, and an adjusting seat. The bolt holder is fixed to the leather cushion's front end and has a retaining wall and a through hole penetrating the retaining wall. The adjusting bolt has a bolt head and a threaded trunk. The bolt head abuts against the retaining wall of the bolt holder and is rotatably received in the through hole of the bolt holder. The threaded trunk has one end connected to the bolt head. The adjusting seat is fixed to the upward-extending portion of the rail and is retained in the retaining bay of the rail. Thereby, the bicycle saddle is more structurally stable and has less noise as compared to the prior art. In addition, the adjusting seat has a threaded hole that is screwed and engaged with the threaded trunk of the adjusting bolt. Thus, when the adjusting bolt rotates, the adjusting seat drives the rail to move, and in turn tension or relax the leather cushion, thereby adjusting the tension of the saddle.

In the first embodiment of the present invention, the adjusting seat has a seat body and an internally-threaded bushing. The seat body abuts against one side of the upward-extending portion of the rail and has an axial hole that is communicated with the retaining bay of the rail. The internally-threaded bushing has a bushing head and a bushing trunk connected to the bushing head. The bushing head abuts against a reverse side of the upward-extending portion of the rail. The bushing trunk passes through the retaining bay of the rail and is fixed in the axial hole of the seat body. The internally-threaded bushing has the threaded hole passing through the bushing head and the bushing trunk. Thereby, the seat body of the adjusting seat and the bushing head of the internally-threaded bushing of the adjusting seat sandwich the upward-extending portion of the rail therebetween. Moreover, the bushing trunk of the internally-threaded bushing of the adjusting seat retained in the retaining bay of the rail prevents the rail from transverse movement, thereby improving the structural stability of the rail.

In the first embodiment of the present invention, the rail has two opposite supporting arms having their front ends connected together so as to form the upward-extending portion. The seat body of the adjusting seat has its bottom formed with two abreast guiding channels. Each of the guiding channels fittingly receives one said supporting arm of the rail, thereby by strengthening the combination between the adjusting seat and the rail.

In the first embodiment of the present invention, the rail further has a propping portion that is fixed to the leather cushion's rear end and has two salients. Each salient has a fixing hole. Each said supporting arm has its rear end provided with an inserting segment and a flange adjacent to the inserting segment. The inserting segment is inserted into the fixing hole of the salient of the propping portion. The flange abuts against the end surface of the salient of the propping portion, for sharing the load born by the propping portion.

In the first embodiment of the present invention, each of the supporting arms of the rail has a peripheral groove formed around the inserting segment. The rail further has two C-clips. Each said C-clip is inlaid in one said peripheral groove and props against the wall of the fixing hole of the salient of the propping portion, for strengthening the combination between the propping portion and the two supporting arms.

Additionally, in a second embodiment of the present invention, the saddle has a leather cushion, a rail, and an adjusting assembly. The rail supports the leather cushion from below. The rail's front end has a fastening block that includes a threaded hole. The rail's rear end is fixed to the leather cushion's rear end. The adjusting assembly is affixed to a bottom surface of the leather cushion and has a bolt holder and an adjusting bolt. The bolt holder is fixed to the leather cushion's front end and has a retaining wall and a through hole penetrating the retaining wall. The adjusting bolt has a bolt head and a threaded trunk. The bolt head abuts against the retaining wall of the bolt holder and is rotatably received in the through hole of the bolt holder. The threaded trunk has one end connected to the bolt head, and an opposite end screwed into the threaded hole of the fastening block of the rail. Thereby, when the adjusting bolt rotates, its screwed combination between the fastening block of the rail can drive the rail to move, thereby tensioning or relaxing the leather cushion.

DETAILED DESCRIPTION OF THE INVENTION

Figure 1:
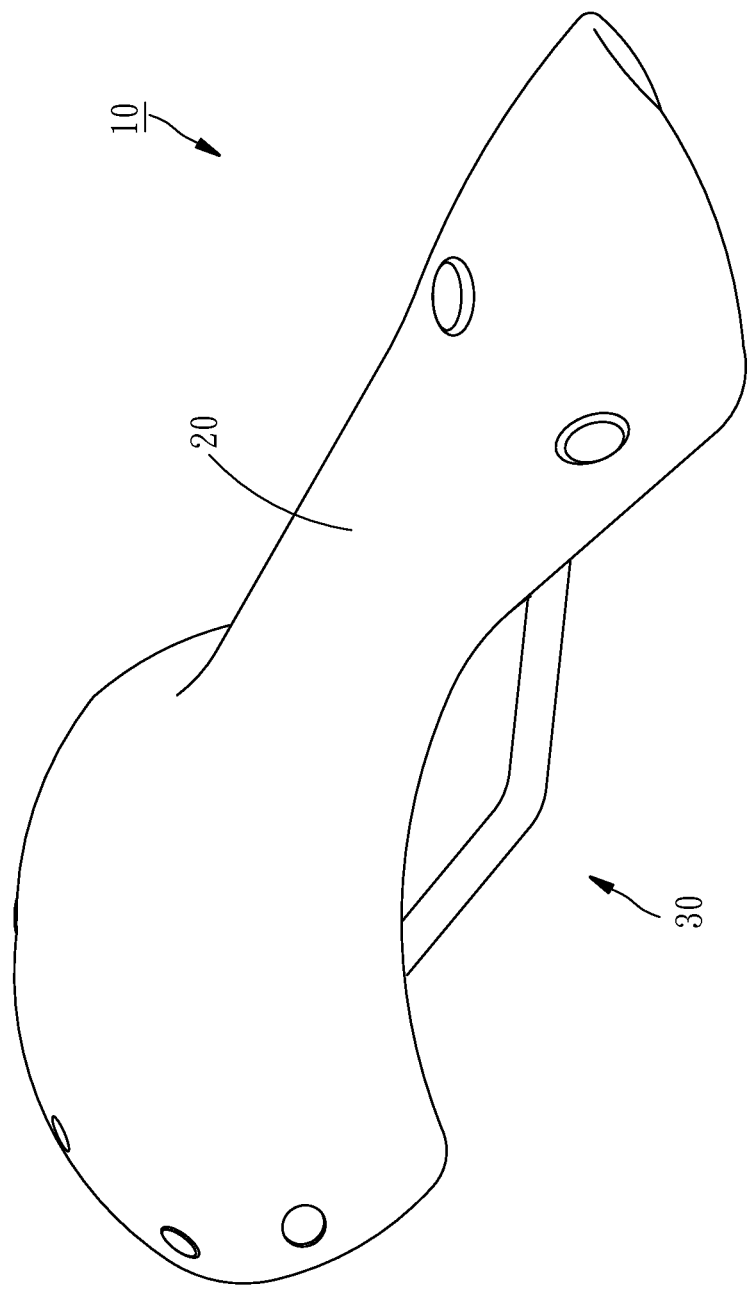
FIG. 1 is a perspective view of a first embodiment of the present invention.
Figure 2:
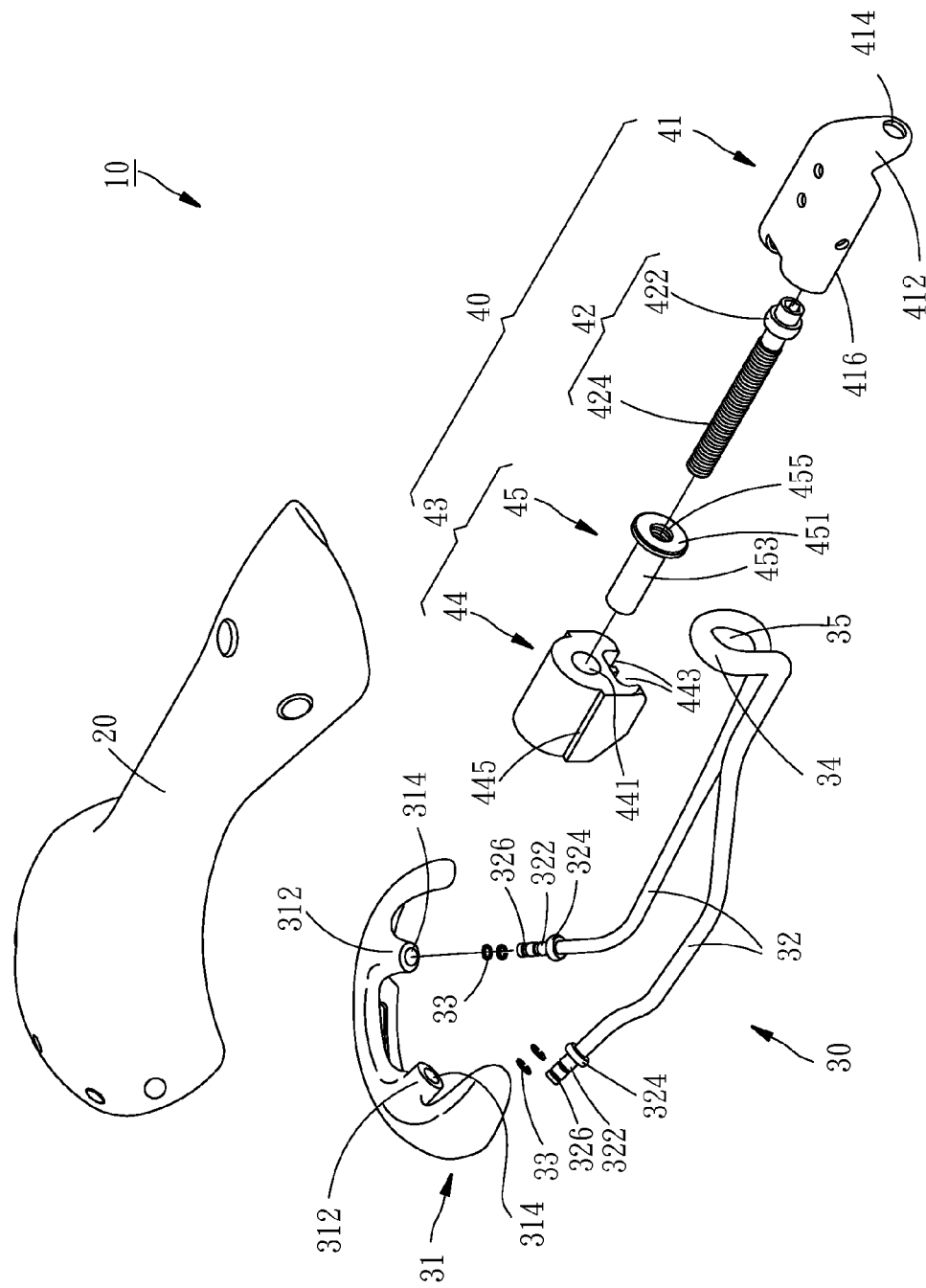
FIG. 2 is an exploded view of the first embodiment of the present invention.

Referring to FIG. 1 and FIG. 2, according to the present invention, a bicycle saddle 10 comprises a leather cushion 20, a rail 30, and an adjusting assembly 40.

Figure 5:
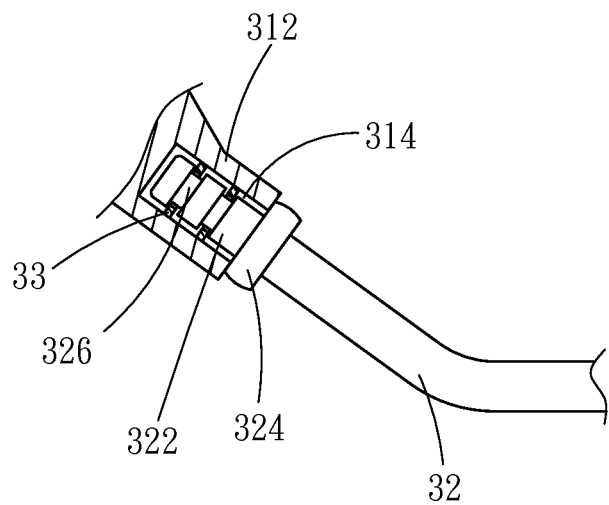
FIG. 5 is another partial, cross-sectional view of the first embodiment of the present invention, showing the relationship between the propping portion and the supporting arms of the rail.

The rail 30 supports the leather cushion 20 from below and has a propping portion 31, two opposite supporting arms 32, and four C-clips 33. The propping portion 31 is screwed to a rear end of the leather cushion 20 and has two salients 312. Each said salient 312 has a fixing hole 314. The two supporting arms 32 have their front end connected together to form an upward-extending portion 34 and a retaining bay 35 defined by the upward-extending portion 34. Each of the two supporting arms 32 has a rear end provided with an inserting segment 322, a flange 324 adjacent to the inserting segment 322, and two peripheral grooves 326 formed on the surface of the inserting segment 322. Each of the C-clips 33 is inlaid into one said peripheral groove 326 of the supporting arms 32. To assemble the components, the inserting segments 322 of the supporting arms 32 are first inserted into the fixing holes 314 of the salients 312 of the propping portion 31 so that the flange 324 of each said supporting arm 32 abuts against the end surface of the corresponding salient 312 of the propping portion 31, as shown in FIG. 5. After the insertion, each the C-clips 33 radially expands by nature and props against the wall of the corresponding fixing hole 314, thereby combining the propping portion 31 and the supporting arms 32 together.

Figure 3:
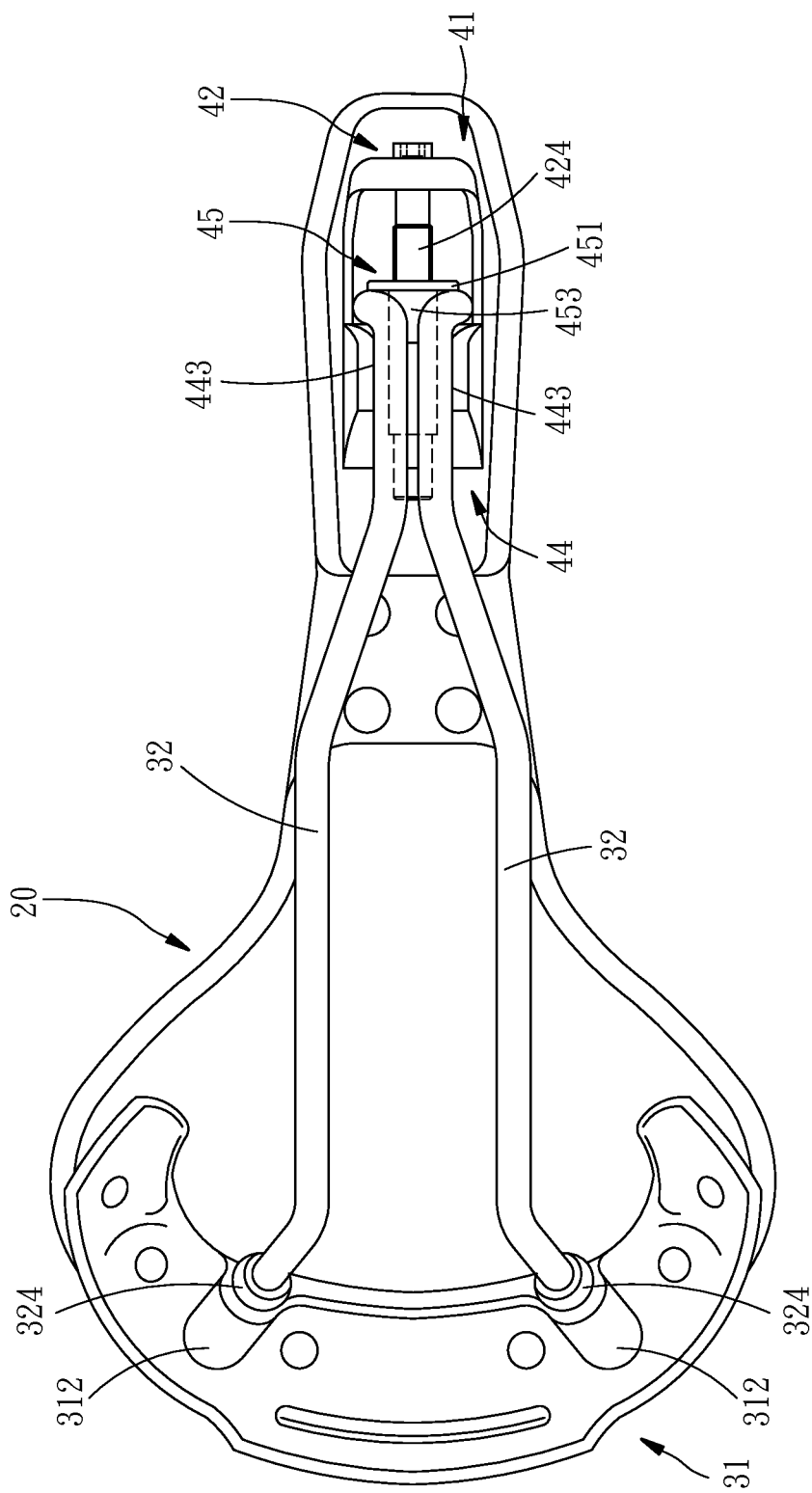
FIG. 3 is a bottom view of the first embodiment of the present invention.
Figure 4:
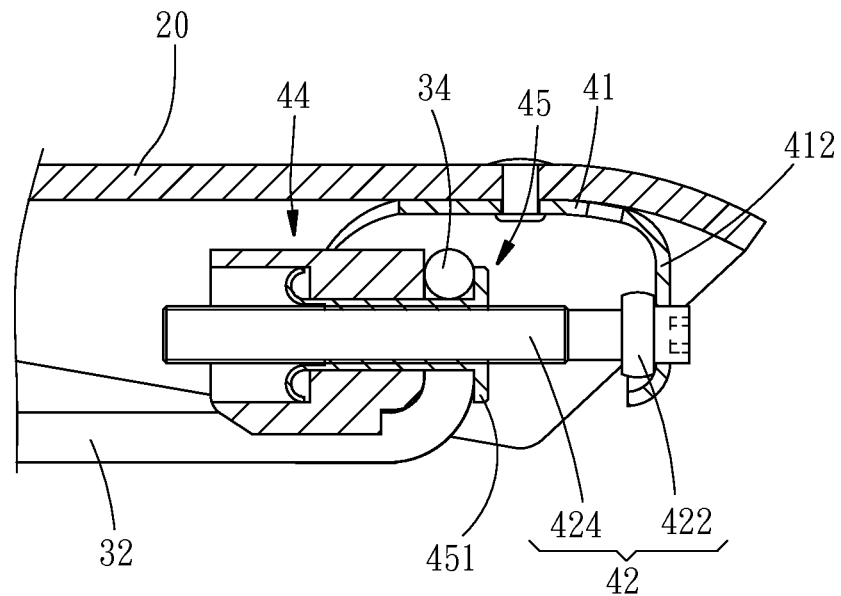
FIG. 4 is a partial, cross-sectional view of the first embodiment of the present invention, showing the relationship between the rail and the adjusting assembly.

The adjusting assembly 40 is affixed to the bottom surface of the leather cushion 20 and has a bolt holder 41, an adjusting bolt 42, and an adjusting seat 43. As shown in FIG. 2 through FIG. 4, the bolt holder 41 is screwed to a front end of the leather cushion 20. The bolt holder 41 has its front end provided with a retaining wall 412 and a through hole 414 penetrating the retaining wall 412. The bolt holder 41 has its left and right laterals each provided with a contacting portion 416. The adjusting bolt 42 has a bolt head 422 and a threaded trunk 424. The bolt head 422 abuts against the retaining wall 412 of the bolt holder 41 and is rotatably received in through hole 414 of the bolt holder 41. The threaded trunk 424 has one end connected to the bolt head 422. The adjusting seat 43 has a seat body 44 that is made of plastic and has an axial hole 441 running through two ends thereof. In addition, the seat body 44 has a bottom formed with two abreast guiding channels 443. The seat body 44 has each of its left and right laterals formed with a guiding step 445. To assemble the components, the seat body 44 has its guiding channels 443 fittingly receiving the supporting arms 32 of the rail 30 so that the end surface of the seat body 44 abuts against one side of the upward-extending portion 34 of the rail 30. At this time, the axial hole 441 is aligned and communicated with the retaining bay 35 of the rail 30, and the seat body 44 has the guiding steps 445 contacting the contacting portions 416 of the bolt holder 41 closely. Furthermore, the adjusting seat 43 has an internally-threaded bushing 45. The internally-threaded bushing 45 is made of metal and has a bushing head 451, a bushing trunk 453 connected to the bushing head 451, and a threaded hole 455 passing through the bushing head 451 and the bushing trunk 453. To assemble the components, the internally-threaded bushing 45 has the bushing trunk 453 passing through the retaining bay 35 of the rail 30 and inserted into the axial hole 441 of the seat body 44, and riveted to the seat body 44. After the foregoing assembling work, the bushing head 451 of the internally-threaded bushing 45 abuts against a reverse side of the upward-extending portion 34 of the rail 30 while the threaded trunk 424 of the adjusting bolt 42 is screwed and received in the threaded hole 455 of the internally-threaded bushing 45. Thereby, when the adjusting bolt 42 rotates, the adjusting seat 43 drives the rail 30 to move forward or backward stably in virtue of the relationship between the guiding steps 445 and the contacting portions 416 of the bolt holder 41. By moving the rail 30 forward or backward, the surface tension of the leather cushion 20 is changed.

With the configuration given above, the disclosed bicycle saddle 10 is superior to the prior art for having the following advantages.

First, as to the structural relationship between the rail 30 and the adjusting seat 43, the upward-extending portion 34 of the rail 30 is sandwiched between the seat body 44 of the adjusting seat 43 and the bushing head 451 of the internally-threaded bushing 45 of the adjusting seat 43, so that when driven by the adjusting bolt 42, the adjusting seat 43 can stably drive the rail 30 to move forward or backward. Meanwhile, the bushing trunk 453 of the internally-threaded bushing 45 of the adjusting seat 43 retains in the retaining bay 35 of the rail 30 prevents the rail 30 from transverse movement. Thereby, the saddle is unlikely to sway and remains structurally stable, and the rail 30 is unlikely to generate noise during cycling.

Second, during cycling, the propping portion 31 of the rail 30 receives the weight of the cyclist through the leather cushion 20 and receives road vibration, and since the salients 312 of the propping portion 31 of the rail 30 abut against the flanges 324 of the supporting arms 32 of the rail 30, the supporting arms 32 of the rail 30 can share the force exerted on the propping portion 31 of the rail 30, thereby improving the structural strength and robustness of the rail 30.

Third, as to the structure of the rail 30, the combination between the fixing holes 314 of the salients 312 of the propping portion 31 and the inserting segments 322 of the supporting arms 32 is secured by the C-clips 33 propping therebetween, and therefore is significantly improved as compared to the tradition approach where only loose or tight fit is implemented. As a result, the structural stability is ensured.

Figure 6:
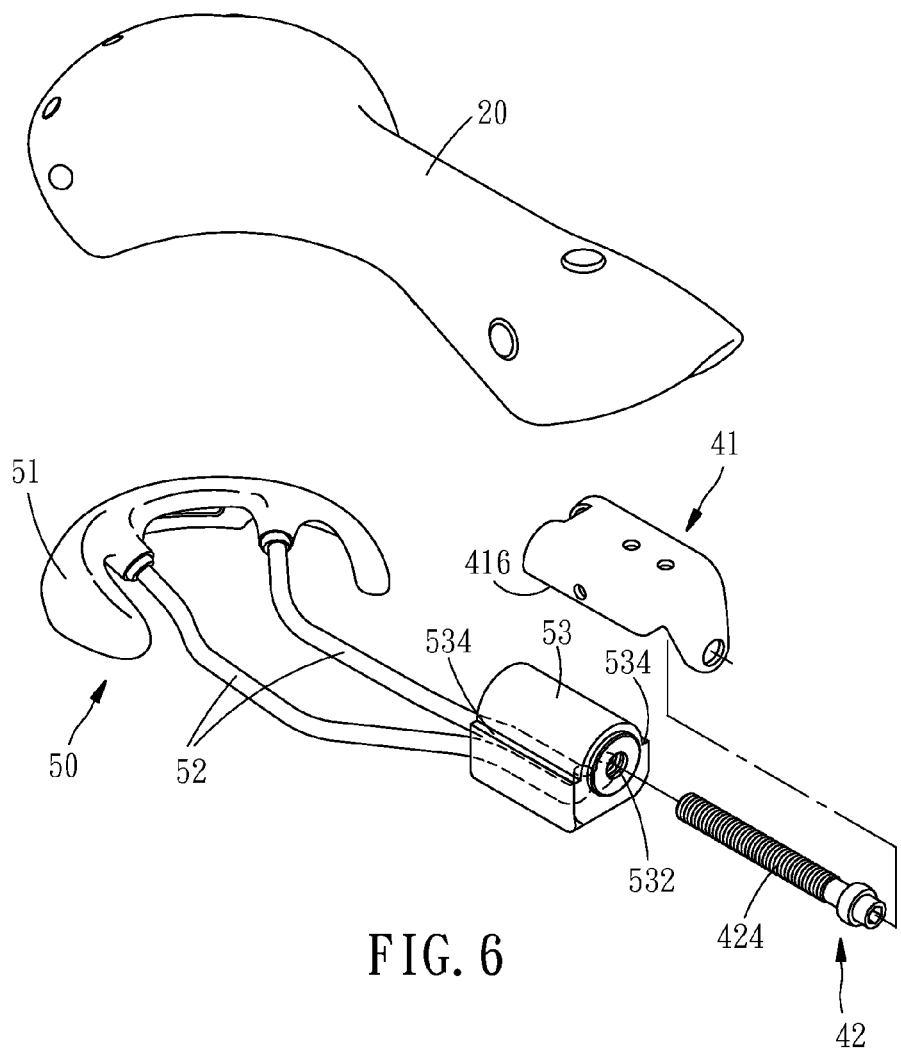
FIG. 6 is an exploded view of a second embodiment of the present invention.
Figure 7:
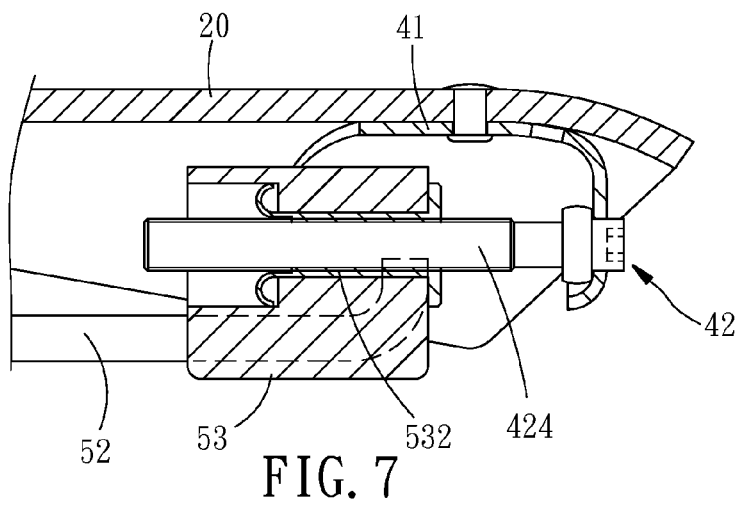
FIG. 7 is a partial, cross-sectional view of the second embodiment of the present invention.

On the other hand, the disclosed rail may be structurally modified. As shown in FIG. 6 and FIG. 7, in a second embodiment, the front ends of the supporting arms 52 of the rail 50 is wrapped and positioned by a fastening block 53. The fastening block 53 has a threaded hole 532 running through two ends thereof. The threaded hole 532 receives the threaded trunk 424 of the adjusting bolt 42. The fastening block 53 has its right and left laterals each formed with a guiding step 534. The guiding steps 534 contact the contacting portions 416 of the bolt holder 41 closely so that the bolt holder 41 is allowed to slide forward and backward against the fastening block 53 stably. Thereby, when the adjusting bolt 42 rotates, its screwed combination between the fastening block 53 of the rail 50 drives the rail 50 to move forward and backward, so as to change the surface tension of the leather cushion 20. Since the propping portion 51 of the rail 50 and the rear ends of the supporting arms 52 of the rail 50 are combined in the same way as described in the first embodiment, the detailed description is herein omitted.

What is claimed is:
1. A bicycle saddle, comprising:
a leather cushion;
a rail, supporting the leather cushion from below wherein the rail has a front end provided with an upward-extend- ing portion and a retaining bay defined by the upward-extending portion, and has a rear end fixed to a rear end of the leather cushion; and an adjusting assembly, being affixed to a bottom surface of the leather cushion, and having a bolt holder, an adjusting bolt, and an adjusting seat, the bolt holder being fixed to a front end of the leather cushion and having a retaining wall and a through hole penetrating the retaining wall, the adjusting bolt having a bolt head and a threaded trunk, the bolt head abutting against the retaining wall of the bolt holder and being rotatably received in through hole of the bolt holder, the threaded trunk having one end connected to the bolt head, the adjusting seat being fixed to the upward-extending portion of the rail and retained by the retaining bay of the rail, and the adjusting seat having a threaded hole that engages with and receives the threaded trunk of the adjusting bolt.

2. The bicycle saddle of claim 1, wherein the adjusting seat has a seat body and an internally-threaded bushing, the seat body abutting against one side of the upward-extending portion of the rail and having an axial hole, the axial hole being communicated with the retaining bay of the rail, the internally-threaded bushing having a bushing head and a bushing trunk connected to the bushing head, the bushing head abutting against a reverse side of the upward-extending portion of the rail, the bushing trunk passing through the retaining bay of the rail and then being fixedly received in the axial hole of the seat body, the internally-threaded bushing having the threaded hole, and the threaded hole passing through the bushing head and the bushing trunk.

3. The bicycle saddle of claim 2, wherein the rail has two opposite supporting arms, the two supporting arms having front ends thereof connected together to form the upward-extending portion, the seat body of the adjusting seat having a bottom provided with two abreast guiding channels, and the supporting arms fittingly received in the guiding channels.

4. The bicycle saddle of claim 3, wherein the rail further has a propping portion, the propping portion being fixed to the rear end of the leather cushion and having two salients, each said salient having a fixing hole, each said supporting arm having a rear end that has an inserting segment and a flange adjacent to the inserting segment, the inserting segments being inserted into the fixing holes of the salients of the propping portion, and the flanges abutting against end surfaces of the salients of the propping portion.

5. The bicycle saddle of claim 4, wherein each said supporting arm of the rail has a peripheral groove formed around the inserting segment, and the rail further includes two C-clips each being inlaid in one said peripheral groove and abutting a wall of the fixing hole of the corresponding salient of the propping portion.

6. The bicycle saddle of claim 2, wherein the bolt holder has two opposite laterals each provided with a contacting portion, and the seat body of the adjusting seat has two opposite laterals each provided with a guiding step, in which the guiding steps contact the contacting portions of the bolt holder closely and slidably.

7. A bicycle saddle, comprising:
a leather cushion;
a rail, supporting the leather cushion from below, wherein the rail has a front end provided with a fastening block that has a threaded hole, and the rail has a rear end fixed to the a rear end of the leather cushion; and
an adjusting assembly, being affixed to a bottom surface of the leather cushion and having a bolt holder and an adjusting bolt, the bolt holder being fixed to a front end of the leather cushion and having a retaining wall and a through hole penetrating the retaining wall, the adjusting bolt having a bolt head and a threaded trunk, the bolt head abutting against the retaining wall of the bolt holder and being rotatably received in the through hole of the bolt holder, and the threaded trunk having one end connected to the bolt head, and an opposite end screwed into the threaded hole of the fastening block of the rail.

8. The bicycle saddle of claim 7, wherein the rail having two opposite supporting arms and a propping portion, the propping portion being fixed to the rear end of the leather cushion and having two salients, each said salient having a fixing hole, each said supporting arm having a rear end provided with an inserting segment and a flange adjacent to the inserting segment, and the inserting segment being inserted into the fixing hole of the salient of the propping portion so that the flange abuts against an end surface of the corresponding salient of the propping portion.

9. The bicycle saddle of claim 8, wherein each said supporting arm of the rail has a peripheral groove formed around the inserting segment, and the rail further has two C-clips, in which each said C-clip being inlaid in one said peripheral groove and abuts against a wall of the fixing hole of the corresponding salient of the propping portion.

10. The bicycle saddle of claim 7, wherein the bolt holder has two opposite laterals each provided with a contacting portion, and the fastening block of the rail has two opposite laterals each provided with a guiding step, in which the guiding steps contact the contacting portions of the bolt holder closely and slidably.

* * * * *